United States Patent [19]

Ramberg

[11] Patent Number: 5,423,373
[45] Date of Patent: Jun. 13, 1995

[54] BYPASS DEVICE FOR RESERVOIR AND INTAKE CONDUIT HEATING OF POWER FLUIDS

[75] Inventor: Charles H. Ramberg, Dayton, Minn.

[73] Assignee: Arctic Fox Heaters, Inc., Delano, Minn.

[21] Appl. No.: 183,646

[22] Filed: Jan. 19, 1994

Related U.S. Application Data

[63] Continuation of Ser. No. 23,486, Feb. 25, 1993, abandoned, which is a continuation of Ser. No. 846,752, Mar. 4, 1992, abandoned, which is a continuation of Ser. No. 666,233, Mar. 8, 1991, abandoned.

[51] Int. Cl.⁶ .................... F02M 31/00; F02M 53/00; F02M 31/16; F02N 17/02
[52] U.S. Cl. .......................... 165/1; 165/35; 165/51; 165/74; 165/132; 123/142.5 R; 123/552; 123/557
[58] Field of Search .............. 165/35, 51, 1, 73, 74, 165/132, 39, 47, 36, 37; 236/18, 19, 20; 123/142.5 R, 557

[56] References Cited

U.S. PATENT DOCUMENTS

| | | | |
|---|---|---|---|
| 1,723,082 | 8/1929 | Schumann | 165/132 |
| 2,618,938 | 11/1952 | Booth et al. | 62/434 |
| 2,641,451 | 6/1953 | Kaiser . | |
| 2,809,810 | 10/1957 | Carroll, Jr. et al. | 165/37 |
| 3,351,130 | 11/1967 | Lowe | 165/132 |
| 3,378,063 | 4/1968 | Mefferd | 123/557 |
| 4,351,301 | 9/1982 | Allen | 123/557 |
| 4,367,717 | 1/1983 | Ray | 123/557 |
| 4,393,851 | 7/1983 | Gorans | 123/557 |
| 4,424,776 | 1/1984 | Allen | 123/142.5 R |
| 4,512,324 | 4/1985 | Neary | 123/557 |
| 4,527,533 | 7/1985 | Laramee | 123/557 |
| 4,534,408 | 8/1985 | Thibonnet | 165/132 |
| 4,553,697 | 11/1985 | Nothen et al. | 123/557 |
| 4,722,314 | 2/1988 | Martinson | 123/557 |
| 4,748,960 | 6/1988 | Wolf | 123/557 |
| 4,811,719 | 3/1989 | Baumann | 123/557 |
| 4,827,889 | 5/1989 | Ray | 123/557 |
| 4,926,830 | 5/1990 | McNelley | 165/51 |
| 4,933,077 | 6/1990 | Wolf | 165/52 |
| 4,964,376 | 10/1990 | Veach et al. | 123/557 |
| 5,029,634 | 7/1991 | Hurner | 165/51 |
| 5,135,044 | 8/1992 | Hurner | 165/1 |

FOREIGN PATENT DOCUMENTS

| | | | |
|---|---|---|---|
| 905590 | 12/1945 | France | 165/39 |
| 2616716 | 12/1988 | France | 123/142.5 R |
| 2618854 | 2/1989 | France | 123/142.5 R |

Primary Examiner—John K. Ford
Attorney, Agent, or Firm—Patterson & Keough

[57] ABSTRACT

A system for controlling the temperature of a power fluid comprising a temperature responsive mechanical manifold which automatically bypasses a heating or cooling heat exchange medium from flow into a heat exchange conduit in a reservoir tank and around a power fluid intake conduit. Improved heat rise within the power fluid intake conduit is accomplished by a baffle assembly. The bypassing of heat exchange medium from the heat exchange conduit is controlled by the fuel temperature sensed proximate the outlet end of the power fluid intake conduit.

15 Claims, 6 Drawing Sheets

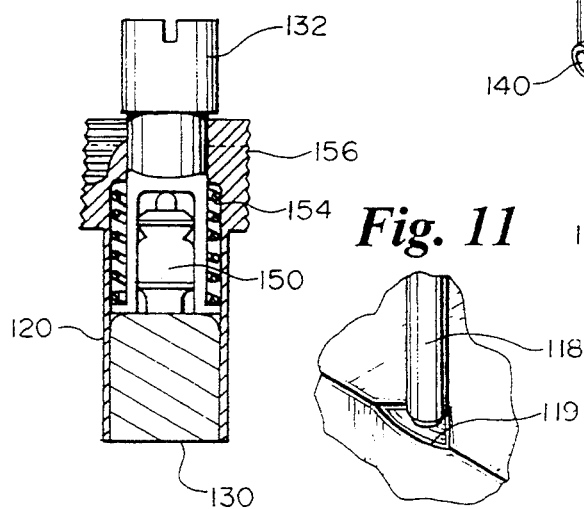
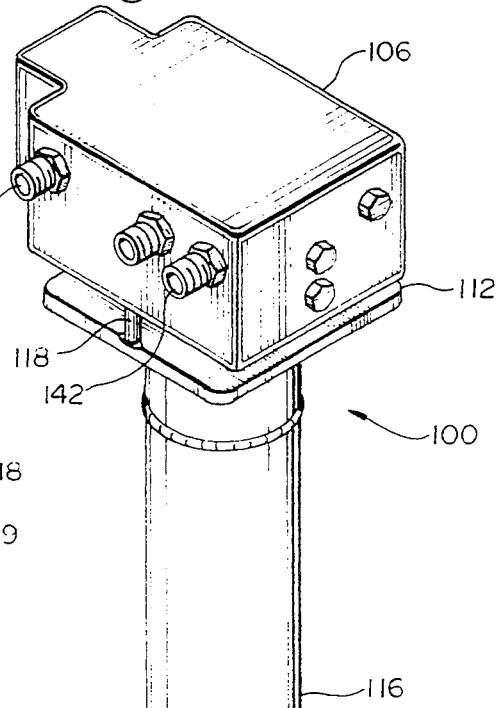
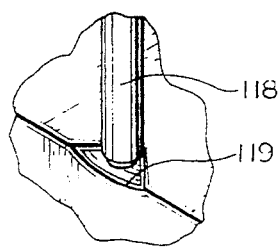
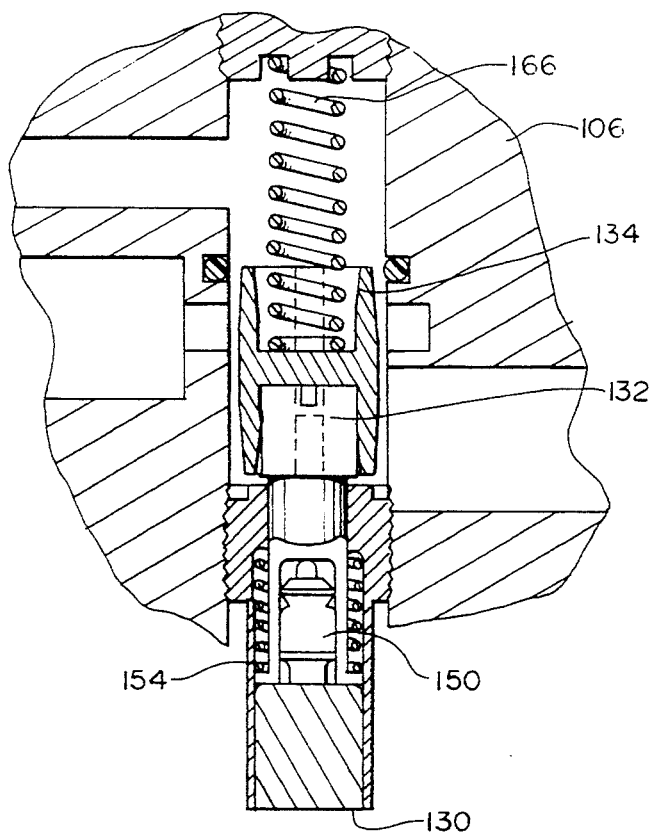

Fig. 12a
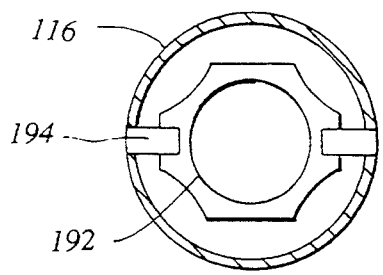
Fig. 12b
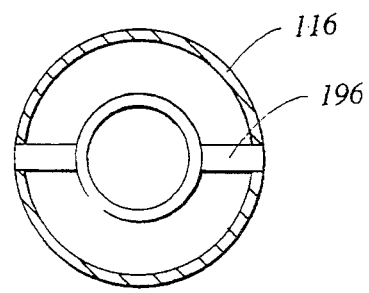
Fig. 12c
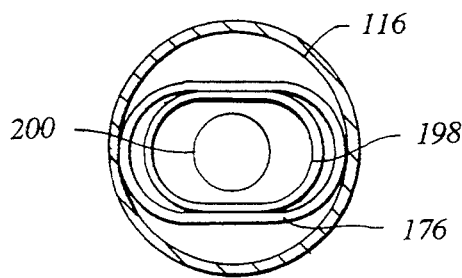
Fig. 12d
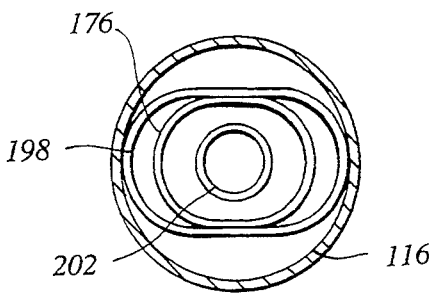
Fig. 13
Fig. 14
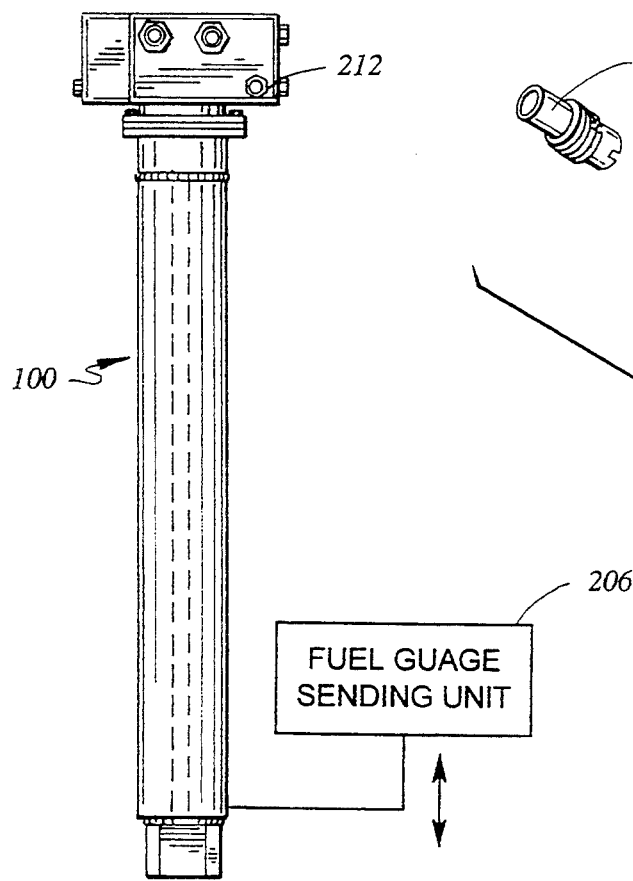

BYPASS DEVICE FOR RESERVOIR AND INTAKE CONDUIT HEATING OF POWER FLUIDS

This application is a continuation of U.S. Ser. No. 08/023,486 filed on Feb. 25, 1993 now abandoned which is a continuation of 07/846,752 filed on Mar. 4, 1992 now abandoned which is a continuation of 07/666,233 filed Mar. 8, 1991 now abandoned.

FILED OF THE INVENTION

The present invention relates generally to a system for controlling the temperature of a power fluid, such as diesel fuel and hydraulic oil. More particularly, this invention concerns a temperature responsive mechanical manifold which automatically bypasses a heating or cooling heat exchange medium from flow into a heat exchange conduit in a reservoir tank and around a power fluid intake conduit. Improved heat rise within the power fluid intake conduit is accomplished by a baffle assembly.

BACKGROUND OF THE INVENTION

Diesel fuel, particularly No. 2 fuel oil, has the tendency to gel or "wax" in cold weather. This gelling of diesel fuel is a particularly acute problem in the trucking industry during colder months in portions of the U.S., Canada, Europe and other high latitude environments. During the winter months, temperatures and wind chill factors frequently reach minus 30° Fahrenheit in these areas. In such a temperature and windchill range, diesel fuel tends to gel or wax both in the fuel tank itself and within a fuel line leading from the tank to the engine. In the severest instances of gelling, the diesel engine completely fails. The truck or other vehicle thus must be towed to a service area and the fuel system heated. The towing and down time of the truck results in increased transportation cost. In less severe instances, the gelling can result in loss of power so that the trucks are forced to travel at a slow rate of speed. This also results in increased transportation cost.

Similar cold weather problems exist with the use of hydraulic oil. Typically, hydraulic oils of various grades experience viscosity changes dependent on temperature. In cold weather or winter months, hydraulic oil which is cold provides slower response times to the equipment it is powering. Moreover, cold hydraulic oil may cause: pump damage from cavitation; slower operation from hydraulic motors; high pressure leaks; blown hose ends; blown seals; and other problems. Often it is necessary to warm the hydraulic oil reservoir prior to powered operation of equipment to avoid improper operation.

Problems also exist when diesel fuel or hydraulic oil is warmer than an optimum operating range. In the case of diesel fuel, optimal operating temperatures may range generally between about 60° F. and about 110° F., subject to quality of the diesel fuel, additives therein, and other considerations. Frequently, diesel fuel in trucks and vehicles operating in warmer climates or for long durations produce heating effects within the engines that cause the fuel temperature to exceed the optimum power ranges. This overheating may result in numerous problems, including damage to electronic components in engine systems. Therefore, it is desirable to reduce the amount of heat in the fuel in such situations. Similarly, when hydraulic oil is warmed beyond an optimum range, power control problems and residual heating effects may occur. It is therefore desirable to reduce the amount of heat in hydraulic oil reservoirs when the temperature of such reservoirs exceeds a predetermined range, but at the same time be able to provide rapid heat rise to such fluids as warranted.

Numerous methods and apparatus have been used in the past in an attempt to solve these or related problems. In many of these prior systems, disadvantages exist. For example, most systems do not provide temperature sensing means which are placed directly into a fuel or oil reservoir tank bottom (let alone in an even more advantageous position) and therefore do not accurately sense a temperature of fuel or oil therein. Further, many prior art systems provide means for bypassing flow of fuel in response to various pressure/temperature sensing means rather than improved regulation of the flow of a heat exchange medium. Moreover, prior art systems do not typically permit continuous flow heat exchange loops during all phases of operation of a vehicle, truck, or other equipment in which the system is functioning. A continuous flow loop during all phases of operation is particularly desirable in cooperation with preheating or precooling devices, as well as pumping means.

Frequently, fuel and oil heating devices do not adequately safeguard electronic components which are now more prevalent within the control systems of engines. This in itself creates various problems. Overheating of electronic components in engine control systems often results in failure of those components. A secondary effect of failure of engine control components may be substantial damage to the engine, or at least a significant degradation in engine operation.

Other disadvantages of present day power fluid temperature control devices include: electrical components which may cause significant installation and maintenance problems; valves which must be manually operated to effect bypass conditions; inefficient placement of heat exchange conduits in relation to the diesel fuel and/or hydraulic oil; difficulty in installation; and, numerous components requiring substantial supply and repair concerns. Other present day systems do not provide devices which may be configured for either heating or cooling purposes using virtually interchangeable parts, while other systems are not optimally located on the top portions of diesel fuel and/or hydraulic oil reservoirs, or at the fuel sending gauge sites. In such systems, adaptability to operation in various climates is also often impractical.

What has been needed has been an improved system for mechanically bypassing heat exchange medium flow; providing an easily installed and readily adaptable system for warm weather or cold weather operations; providing means for temperature sensing of diesel fuel or hydraulic oil at a location just prior to the fluid entering the critical components of the operating system but (optionally) after preheating has occurred in both the reservoir and the intake conduit for such fluid; providing for continuous loop heat exchange medium flow when the system is in a bypassed mode; providing improved heat rise for warming of power fluids; providing means for warming or cooling fuel oil when that oil is being drawn into a fuel line from a diesel fuel reservoir; and, providing a non-electrical, completely mechanical actuator means for operating the manifold device, thereby permitting more reliable operation. Also, a power fluid reservoir and intake conduit heating and cooling system which is relatively inexpensive to manufacture and which is easily installed is preferred.

Objects and advantages of the present invention in achieving these and other goals will become apparent from the following descriptions, taken in connection with the accompanying drawings, wherein are set forth by way of illustration and example certain embodiments of the present invention.

SUMMARY OF THE INVENTION

A system is provided to control the flow of a heat exchange medium through a heat exchanger positioned in a reservoir tank of fluids. More specifically, the system is operable to assist in the automatic bypassing of heat exchanger medium flow from entering a heat exchanger in a reservoir tank for diesel fuel or hydraulic fuel or other power fluids. The system is particularly well suited for the first two fluids due to the recognized need to maintain these fluids within predetermined ranges of temperature. Use of either of these fluids (or other fluids) at temperatures beyond predetermined ranges results in undesirable characteristics which effect operation of vehicles, engines, and other equipment using these fluids as a power source and/or coolant.

Systems according to the present invention include: a system for controlling the heat exchanger medium within a heat exchanger positioned in a reservoir tank for containing liquids; such a system comprising a liquid pickup conduit having an inlet and an outlet, the inlet being insertable into the reservoir tank, and heat exchanger means for heating both the liquid in the reservoir tank and the liquid in the pickup conduit, the heat exchanger means including a heat conductive portion insertable into the reservoir tank in contact with the liquid in the tank, inlet means for admitting a heatable fluid into the heat conductive portion, outlet means for discharging the heatable fluid from the heat conductive portion, the heat conductive portion of the heat exchanger means surrounding a first portion of the liquid pickup conduit between the inlet and the outlet; and baffle means positioned in the liquid pickup conduit for slowing the flow rate of liquid through the conduit and for providing improved heat transfer between the heat conductive portion and the liquid flowing through the liquid pickup conduit. Such a system may also include a liquid pickup conduit comprising an elongate tube with a substantially oblong cross-section. The baffle means may also comprise an elongate spiral member or members, an elongate rod or rods, at least one baffle plate, or other analogous configurations.

Another system according to this invention includes a bypass device for reservoir and intake conduit heating for a power fluid system having a reservoir tank for storing the power fluid, comprising: heat exchanger means having a casing including a cylindrical, heat conductive, external shell insertable into the reservoir tank in contact with the stored power fluid, inlet means for admitting a heatable (or coolable) fluid into the casing, outlet means for discharging the heatable fluid from the casing; a power fluid pickup/intake conduit supported by the casing and including an inlet, an outlet, and a first portion extending generally coaxially through the shell of the casing and terminating with the inlet; and bypass means for selectively admitting flow of heatable fluid into said external shell, said bypass means responsive to the temperature of the power fluid proximate the outlet of said power fluid pickup conduit for admitting flow of heatable fluid to said heat conductive external shell when sensed temperature is at a predetermined minimum value and alternatively bypassing said heat conductive external shell when said temperature exceeds a predetermined value (or possibly the reverse in a cooling configuration). This system may also comprise bypass means having a self-contained wax thermostat. Yet another feature may include a power fluid pickup conduit comprising internal baffle means for slowing the flow rate of fluid through the conduit and for providing improved heat transfer between the heatable fluid in the casing and power fluid in the power fluid pickup conduit. Preferably, control systems according to this invention are connected by conduit means or the like with a diesel engine coolant system. It will be understood from the detailed descriptions herein that the control system of the present invention is particularly well adapted for this and other configurations.

For preferred embodiments, the power fluid pickup conduit comprises an elongate tube having internal baffle means comprising a baffle member with a spiral configuration. Such a spiral configuration tends to slow the flow of the power fluid therethrough while at the same time promoting the movement of the fluid in the proper direction and manner toward an outlet of the power fluid pickup conduit. It is appreciated, however, that other embodiments of baffling means may be employed within the scope of this invention within the power fluid pickup conduit.

The drawings constitute a part of this specification and include exemplary embodiments with the present invention, while illustrating various objects and features thereof. It will be understood that in some instances relative material thicknesses and relative component sizes and dimensions may be shown exaggerated, to facilitate an understanding of the invention.

BRIEF DESCRIPTION OF THE DRAWINGS

FIG. 8 is a side partial cutaway view of the self-contained wax thermostat according to the present invention.

FIG. 9 is a sectional environmental view showing the operation of the self-contained wax thermostat illustrated in FIG. 8 in cooperation with the bypass valve means components.

FIG. 10 is a perspective view of the assembled invention according to one embodiment illustrating the manifold means assembled with the outer casing, with a portion of the outer casing cutaway to expose the power fluid intake conduit and its further internal baffle means.

FIG. 11 illustrates the alignment pin and detente arrangement to assist in proper placement of the manifold means on the appropriate mounting plate.

FIG. 12a is a top plan view of a removable baffle neck constructed for placement around the upper portion or outlet section of the power fluid intake conduit.

FIG. 12b is a top plan view of a permanent configuration for baffle means within the heat exchange conduit or casing surrounding the power fluid intake conduit.

FIG. 12c is a top plan view of a heat exchanger means casing comprising a power fluid intake conduit therein, the intake conduit further containing baffle means having an internal spiral baffle and a solid rod baffle.

FIG. 12d is a top plan view of a heat conductive outer casing containing a power fluid intake conduit therein, the intake conduit further having baffle means with a spiral baffle and a hollow tube baffle therein.

FIG. 13 illustrates an alternate embodiment apparatus according to the present invention with a modified coolant flow outlet port location and an integral fuel gauge sending unit assembly.

FIG. 14 is a perspective view of the self-contained wax thermostat according to the present wax thermostat invention along with a maintenance wrench designed specifically therefor.

As required, detailed embodiments of the present invention are disclosed herein. It is to be understood, however, that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed system or structure.

Figure 1:
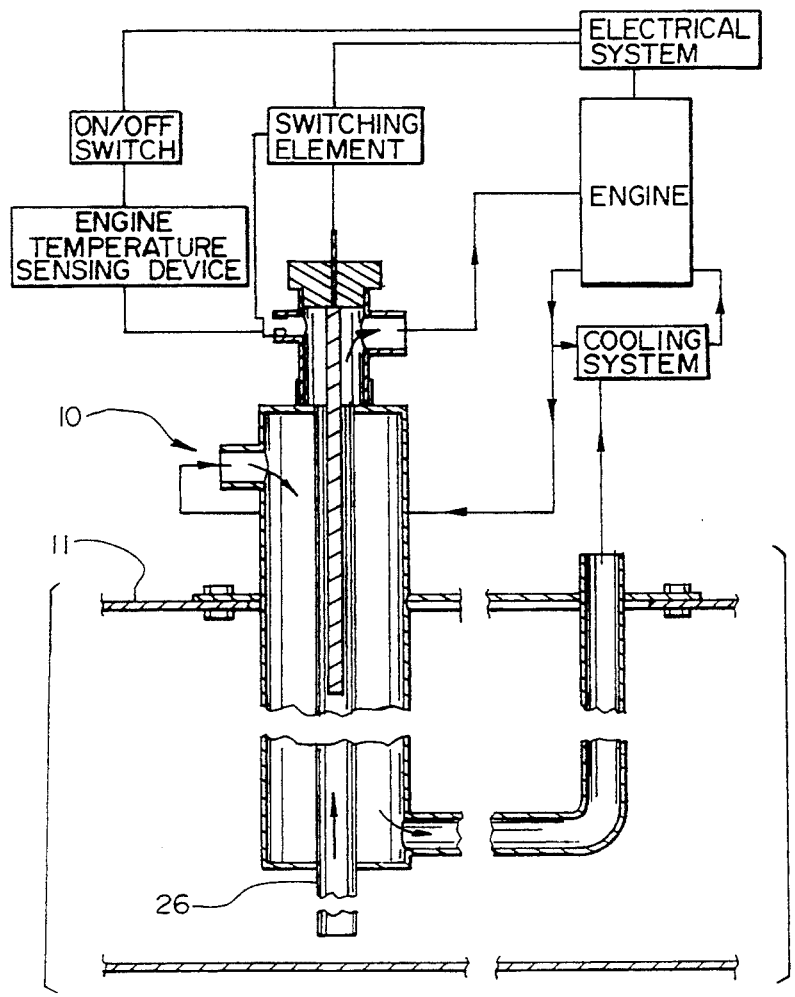
FIG. 1 is a block diagram of a fuel system which incorporates a fuel heating apparatus comprising a fuel pickup conduit having an inlet, an outlet, and a first portion insertable into a fuel or fluid holding container, the first portion terminating with the inlet. The heating apparatus also comprises a heat exchanging assembly insertable into the container for passing heatable fluid adjacent the first portion of the fuel pickup conduit. The heating apparatus may also comprise a heating unit including an electrical heating element mounted proximate the fuel pickup conduit and further including a connector for supplying electrical energy to the heating element.

Referring to FIG. 1, the reference numeral 10 generally designates an exemplary fuel heating apparatus mounted in a fuel tank 11 for heating both the fuel in the fuel tank and the fuel in the pickup conduit 26. This device is represented in U.S. Pat. No. 4,748,960 and provides a pioneering approach to more efficient heating of the fuel in the fuel intake conduit as well as the fuel in the fuel tank over any other prior art.

Figure 2:
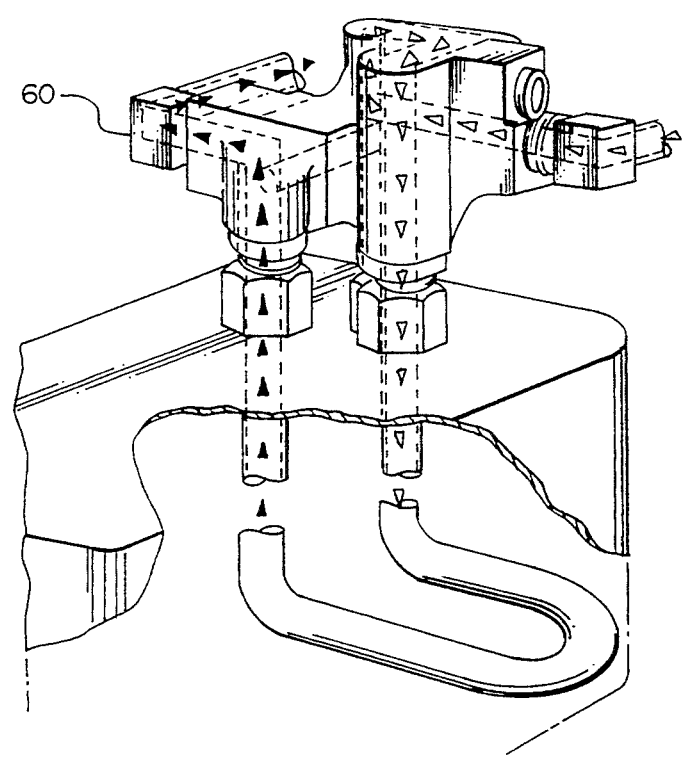
FIG. 2 discloses a system for controlling the heating of, inter alia, diesel fuel in a fuel tank of a diesel engine system to prevent diesel engine control electronics damage. The mechanically operated system also provides temperature control means for controlling various temperatures of hydraulic oil in hydraulic oil reservoir tanks. The system may also be utilized to facilitate flow of a heat exchange medium which cools fluid in either diesel fuel or hydraulic oil reservoir tanks.

FIG. 2 illustrates the device patented in U.S. Pat. No. 4,964,376, which provides a system for bypassing heat exchange medium flow at predetermined temperature ranges to prevent overheating of diesel fuel in a diesel fuel reservoir tank by the heat exchange medium. This device, represented by numeral 60, represents a considerable improvement over other known devices due to, among other reasons, its ability to mechanically bypass coolant flow from entering into a heat exchanger in a fuel tank based on the temperature of the fuel as sensed in the tank. This is particularly important with regard to modern engines which contain various heat sensitive electronic components.

However, what is further needed is a device which accurately and mechanically senses the temperature of a power fluid, such as a diesel fuel, just prior to such fluid entering subsystems which might be adversely affected by improperly heated or cooled power fluids. In other words, what has been needed has been a mechanical (and thus relatively simple) bypass assembly which comprises means for heating, bypassing, or actually shutting coolant flow off from, corresponding heat exchanger means. Preferably, such heat exchanger means comprise means for heating both the power fluids in a reservoir tank as well as in the power fluid intake conduit in such a system. In a bypass system such as the one according to the present invention there is provided means for bypassing coolant in a mechanical manner through use of a newly designed self-contained wax motor assembly which, due to its unique placement in the device, permits very accurate sensing of the power fluid at the critical sensing point.

Figure 3:
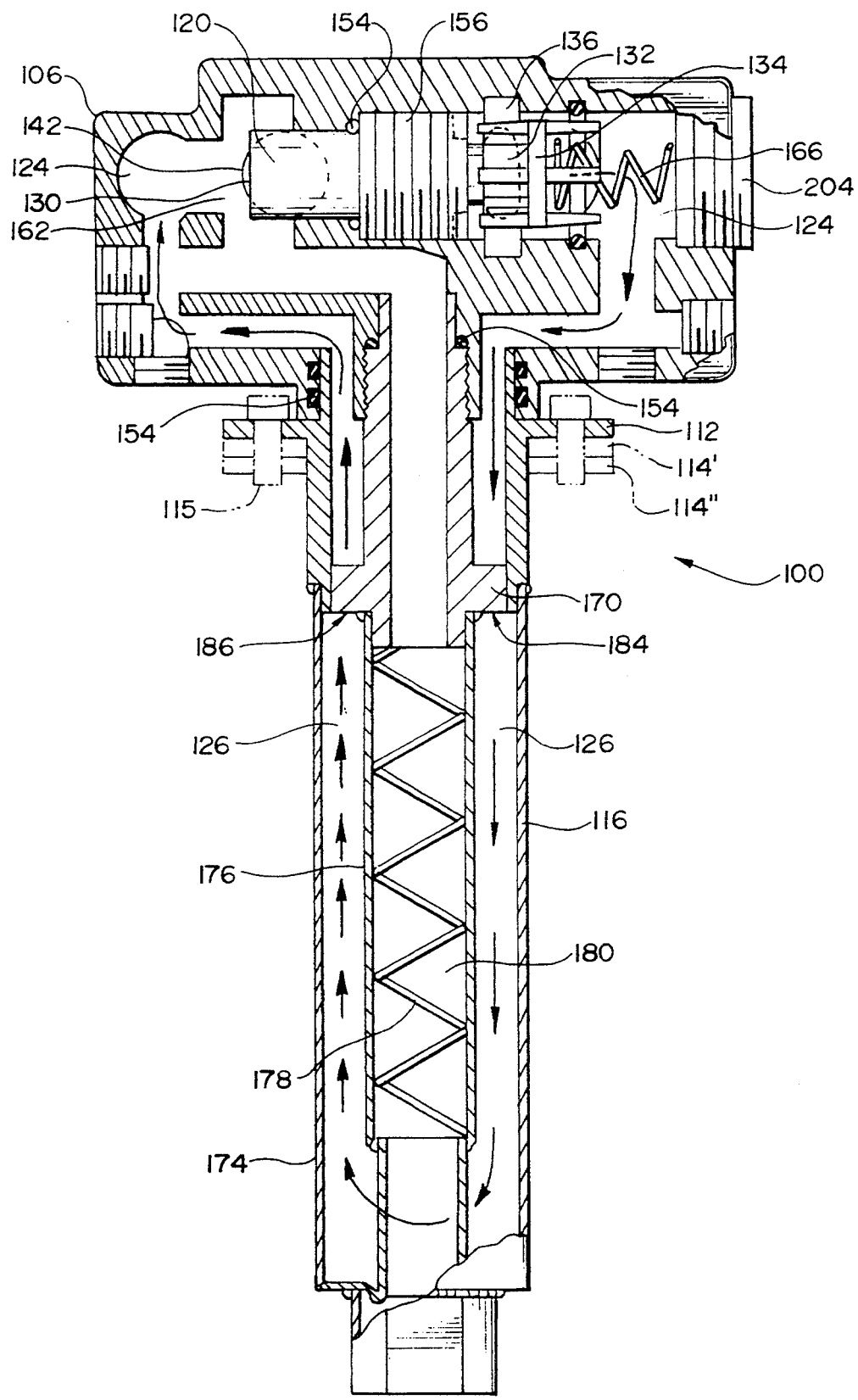
FIG. 3 is a vertical side sectional view of the apparatus according to the present invention comprising a power fluid intake conduit having baffle means therein as well as heat exchanger conduit means surrounding the power fluid intake conduit, and manifold means to provide bypass control.

FIG. 3 illustrates the bypass device 100 according to the present invention which provides means for heating power fluids in a power fluid reservoir tank, heating power fluids in a power fluid intake conduit, bypassing coolant flow to prevent such heating cycles, and optionally shutting off coolant flow to the device in a more permanent manner than in other automatic cycling options.

Figure 4A:
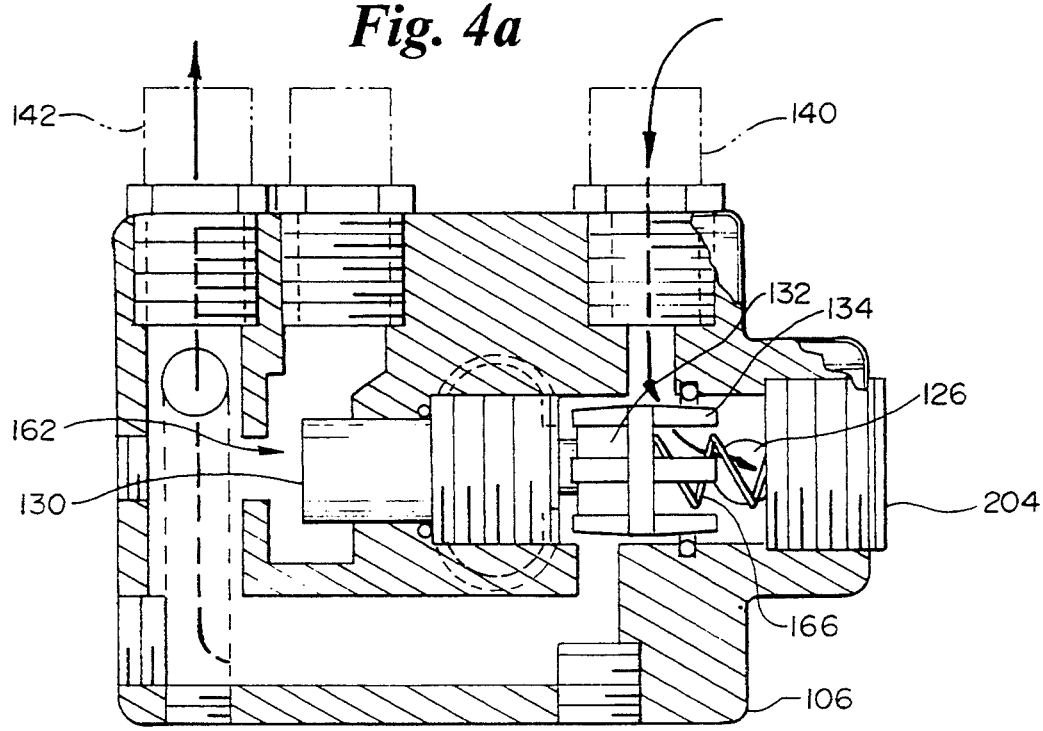
FIG. 4a is a top sectional view of the manifold means according to the present invention, the manifold means being shown in a normal coolant flow mode wherein heatable fluid flows through the manifold means and surrounds a power fluid intake conduit prior to exiting the manifold means.
Figure 4B:
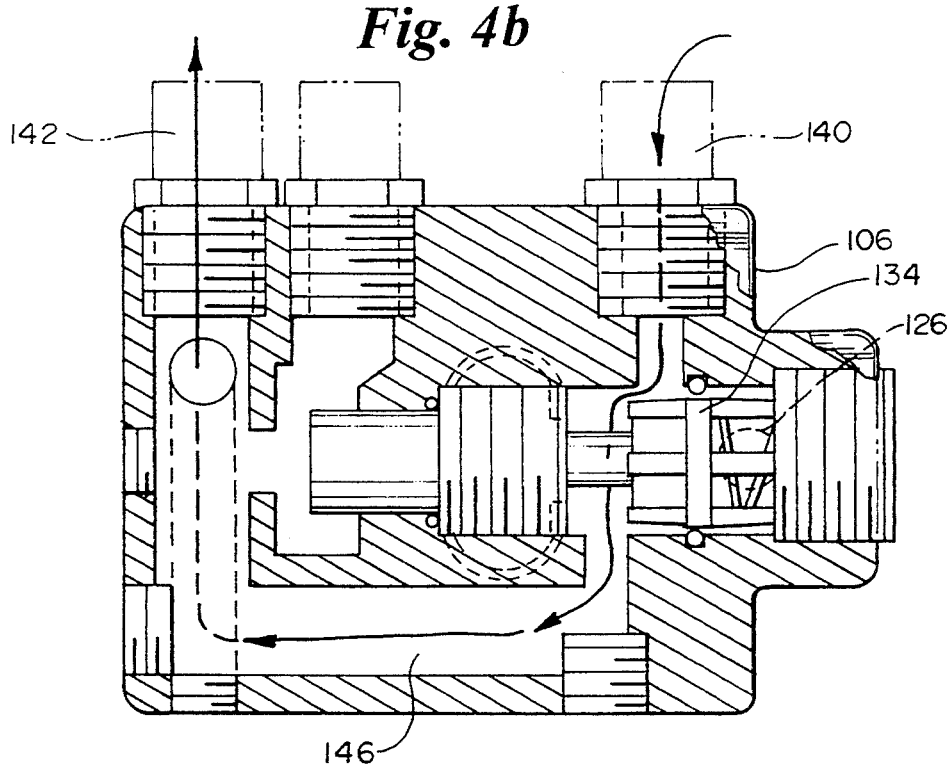
FIG. 4b is a top sectional view of the manifold means according to the present invention, the manifold means being shown in a bypass mode wherein heatable fluid is bypassed to flow only through the manifold means.
Figure 5:
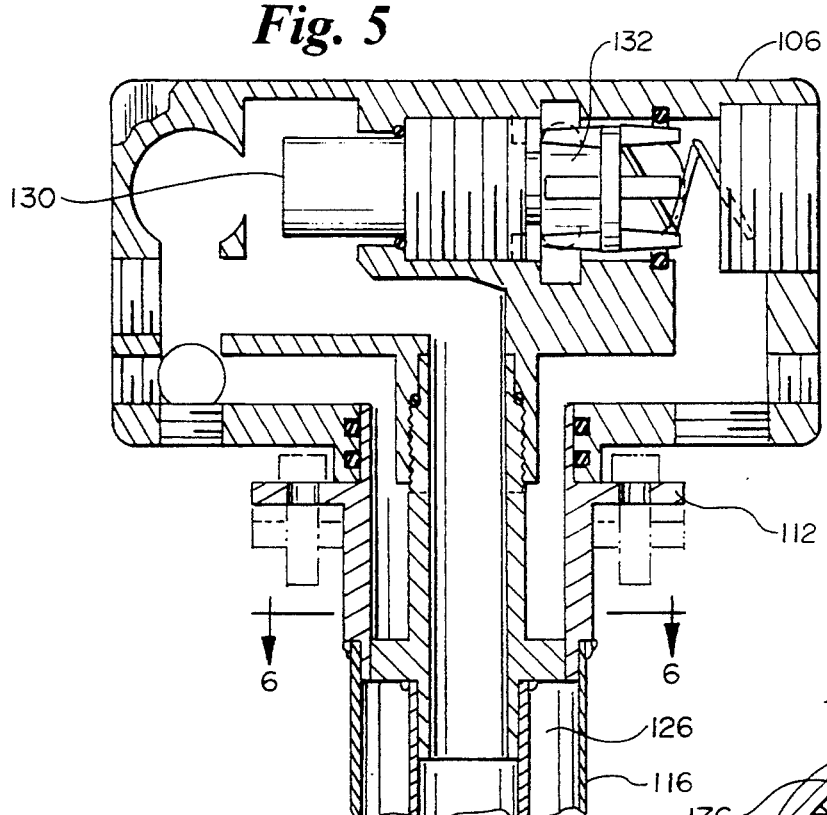
FIG. 5 is a side elevation sectional view of the upper portion of the present invention.

Bypass 100 comprises a head section or manifold means 106, mounting means 112, and heat exchanger casing means 116. Manifold means 106 comprises various flow chambers and sub-assemblies for routing coolant fluid and power fluid therethrough. As illustrated in FIG. 3, bypass valve means comprising self-contained wax motor assembly 120 is operable to selectively admit flow of a heatable (or coolable) fluid from a source external to bypass device 100 through manifold means 106 coolant flow chamber 124 and through casing means coolant flow chambers 126, as shown in dark arrows. An alternate view of manifold means 106 and the normal flow of heatable fluid therethrough is illustrated in FIG. 4a, also by dark arrows. In the fluid flow bypass mode, as illustrated in FIG. 4b, manifold means 106 self-contained wax motor assembly 120 functions to block coolant flow into casing means coolant flow chambers 126 and instead routes such coolant flow only through manifold bypass 146.

Referring to FIG. 3 (and related FIGS. 4a, 4b, 5, 7, and 9) self-contained wax motor assembly 120 comprises a power fluid temperature sensing end 130 and a temperature responsive piston or telescoping stem 132. Telescoping stem 132, as also shown in more detail in FIG. 8, is constructed and arranged for movement and carriage of a bypass cap 134 in relation to bypass groove 136. The position of bypass cap 134 accordingly permits flow of a heatable fluid, such as an engine coolant fluid, from a coolant inlet section 140, as shown in FIG. 4a, into coolant flow chamber 126, and out of coolant outlet section 142. Alternately, bypass cap 134 is positioned to receive heatable fluid in a manner which routes it through manifold means bypass chamber 146 and out of coolant outlet section 142 without any flow into the casing means coolant flow chamber 126, as illustrated in FIG. 4b.

Referring to FIG. 8, self-contained wax motor assembly 120 is shown in cutaway view as having an internal fuel temperature sensing means 150, located proximate temperature sensing end 130. A preferred fuel temperature sensing means 150 is a thermostatic actuator manufactured under the name "POWER PILL®". Fuel temperature sensing means 150 may be set for response to various temperature ranges according to the application desired. Further, telescoping stem 132 may be correspondingly set for response to the various temperature ranges according to the application desired and the settings of the fuel temperature sensing means 150. The use of a telescoping stem 132, motor assembly sealing means 154, threaded housing 156, and the precise placement of the wax motor assembly 120 in manifold means 106 provides a novel device in and of itself. The particular novelty of this wax motor assembly 120 further resides in its ability to provide accurate temperature sensing of the power fluid in the power fluid outlet flow chamber 162 at power fluid temperature sensing end 130, while simultaneously providing bypass capability for the heatable fluid flow by movement of telescoping stem 132 at the other end of the wax motor assembly. This is accomplished without any leakage of a power fluid into the heatable fluid, or in other words without any leakage of, for example, diesel fuel into engine coolant. Moreover, the advantage of this unique system includes sensing of power fluid temperature, such as diesel fuel, at the optimal point in the fuel or fluid flow path outside of a reservoir tank yet prior to such fluid entering an engine subsystem, such as a primary filter or the injectors. This alone, or in combination with the other advantages and novel features of this combination invention represents substantial improvements over known prior art devices. These advantages and improvements function to enhance heat transfer, system accuracy, assembly, overall system integration, and reliability. Resilient biasing means 166 is also provided for aiding in return stroke operation of self-contained wax motor assembly 120.

FIGS. 3, 10, and 13 illustrate mounting means 112. Mounting means 112 preferably comprises mounting plate 114', optionally constructed and arranged for mounting over the fuel gauge sending plate 114" of a reservoir tank. Suitable mounting means 115 is provided and may be mounted through apertures in the mounting and sending plates of varying sizes and shapes to permit optimum flexibility and mounting arrangements. Thus, mounting means 112 is mounted so that subtending casing means 116 extends into a reservoir tank, such as a fuel tank, to provide improved heat transfer properties and bypass capabilities for the entire system. FIG. 11 is an enlarged view of the convenient arrangement of alignment pin 118 and detente 119 to assist in proper orientation of manifold means 106 on the appropriate plate 114'.

Figure 6:
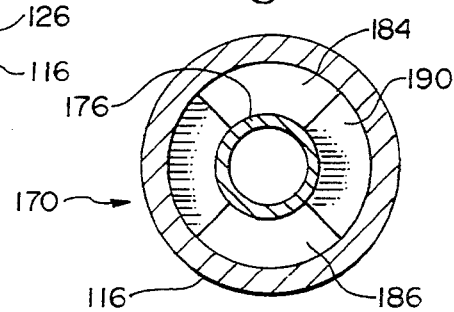
FIG. 6 is a top sectional view of the outlet section of the power fluid intake conduit.
Figure 7:
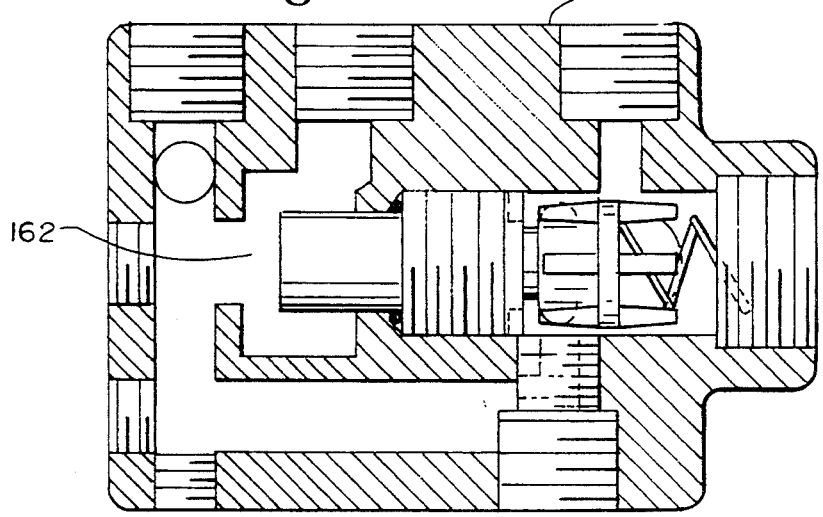
FIG. 7 is a top sectional view of the manifold means according to the present invention.

Casing means 116 comprises baffle assembly 170, outer casing 174, power fluid intake conduit 176, and power fluid intake flow chamber 180. Outer casing 174 preferably comprises a cylindrical, heat conductive, external shell, preferably of durable steel construction which is arranged for insertion into a reservoir tank for contact with a volume of stored power fluid therein. Inlet means 184 is provided for admitting a heatable fluid into casing means coolant flow chambers 126, and outlet means 186 is provided for discharging the heatable fluid from the heat conductive portion of the heat exchanger means (which includes the outer casing)-thus substantially entirely surrounding the power fluid intake/pickup conduit between the inlet and the outlet. A baffling neck 190 is illustrated in FIG. 6, and is positioned between casing means 116 and power fluid intake conduit 176 to permit placement of other baffle assembly components thereon and to enhance the baffled separation of flow of heatable fluid through casing means 116. For example, baffle extender 192, shown in FIG. 12a, may be placed on top of baffling neck 190 using alignment extensions 194 in cooperation with opposing detentes on baffling neck 190. FIG. 12b discloses an optional, permanently mounted, baffling system comprising a baffle plate 196.

In addition to routing of heatable fluid or coolant within the portion of bypass device 100 comprising the heat exchanger means casing means 116, baffle means is provided within power fluid intake conduit 176 in order to slow the flow rate of fluid therethrough and/or to provide improved heat transfer between the heatable fluid in the casing means coolant flow chambers 126 and the power fluid flowing through the power fluid intake/pickup conduit 176. This feature of the invention provides an improved heat distribution means within the pickup conduit for the fluid in the reservoir tank passing through the bypass device. This concept may also be applicable to intake lines in analogous systems, for example in water separation devices, subject to certain limitations. This invention thus promotes greater heat rise, if desired, as the power fluid flows through bypass device 100.

Various configurations of heat distribution means are provided and encompassed within the scope of this invention. For example, as shown in FIG. 3 and in the partial cutaway view of FIG. 10, a spiral member 178(or involute spiral, ramped, or stepped internal member configuration) is provided within power fluid intake conduit flow chamber 180. This heat distribution means may be integrally manufactured with power fluid intake conduit 176 or may be separately inserted therein. Further examples of heat distribution means include the exemplary configurations of FIGS. 12c and 12d. FIG. 12c illustrates casing means 116 power fluid intake conduit 176, spiral member 198, and rod 200. Similarly, FIG. 12d illustrates casing means 116, power fluid intake conduit 176, spiral member 198, and hollow tube 202.

What is provided, therefore, is a means for drawing fuel or other power fluid, such as hydraulic oil, into an operating system while sensing the temperature of the fuel after it has exited a reservoir tank. This permits very accurate sensing of the fuel or power fluid at critical times prior to such fluid entering the operating system, while at the same time avoiding the errors attendant in only sensing the temperature of such power fluids in the tank. Moreover, bypass device 100 and its components provide a rapid response for bypassing coolant flow simultaneous with the temperature sensing of the power fluid. It is also possible to easily regulate (or shut off) the coolant flow of heatable coolant fluid to a heat exchanger or to bypass the coolant flow to go only through other sub-systems in the truck, vehicle, or other global system encompassing this bypass device 100. It is further possible to completely isolate or shut off the coolant flow to casing means 116 by simple removal of a particular casting plug, such as plug 204 and inserting a rerouting plug as appropriate. This is a conceivable need in view of the wide range of operating environments in which bypass device 100 may be employed. For example, a vehicle traveling in a warm weather region might employ the rerouting plug during the time of operation in such region to avoid undesired coolant flow and heat exchange. If, however, various temperature cycles are to be encountered, then it may be preferable to operate in the normal mode of selective bypassing based on temperature responses by the self-contained wax thermostat motor assembly.

FIG. 13 illustrates an embodiment of bypass device 100 of the present invention incorporating an integral fuel gauge sending unit 206 thereon, which may be connected through a folding manipulation during mounting and assembly. The embodiment of bypass device 100 shown in FIG. 14 also includes a repositioned heatable fluid or coolant flow outlet port 212 which has been found to be preferably re-located under some circumstances of operation.

FIG. 14 illustrates a unique removal wrench 220 for providing ready removal, maintenance, and replacement of self-contained wax motor assembly 120 as required.

The invention accordingly consists in the features of the construction, combinations of elements, and construction of parts which will be exemplified in the construction described above and of which the scope of the invention would be indicated in the following claims. It is to be understood that while certain embodiments of the present invention have been illustrated and described, the invention is not to be limited to these specific forms or arrangements of parts herein described and shown.

What is claimed is:

1. A bypass device for use in a power fluid system which heats a power fluid reservoir tank and intake conduit by using a heatable fluid, the bypass device comprising:
    (a) heat exchanger means for heating power fluid located in the reservoir tank and intake conduit, the heat exchanger means comprising (i) a cylindrical, heat conductive, external shell casing which is operatively configured for insertion into the reservoir tank to be in contact with the power fluid, (ii) inlet means for admitting the heatable fluid into the casing, and (iii) outlet means for discharging the heatable fluid from the casing;
    (b) a power fluid intake conduit, supported by the heat exchanger means, including an inlet, an outlet, and a first portion extending generally axially through the heat exchanger means and terminating with the inlet; and
    (c) a bypass manifold means, operably connected to the heat exchanger means and the power fluid intake conduit, for selectively admitting flow of the heatable fluid into the heat exchanger inlet means in response to a particular temperature of the power fluid proximate the power fluid intake conduit outlet being below a predetermined minimum value, the bypass manifold means comprising means for completely bypassing the heat exchanger means when the particular temperature of the power fluid exceeds a predetermined maximum value.

2. The bypass device of claim 1 wherein said bypass manifold means comprises a self contained wax thermostat.

3. The bypass device of claim 1 wherein said power fluid intake conduit comprises internal baffle means for turbulating the power fluid passing through the intake conduit to provide improved heat transfer between the heatable fluid in the heat exchanger means and the power fluid in the power fluid intake conduit.

4. The bypass device of claim 1 wherein the bypass manifold means blocks heatable fluid from entering into the bypass manifold and permits exiting of the heatable fluid when the particular temperature of the power fluid exceeds the predetermined maximum value.

5. The bypass device of claim 1 further comprising a power fluid gauge sending unit connected to the bypass device.

6. The bypass device of claim 5 wherein the heat exchanger means is operatively configured for insertion through an opening for a power fluid gauge sending unit and into the reservoir tank.

7. A bypass device for controlling a power fluid temperature in a power fluid system having a reservoir tank, the power fluid temperature control occurring at a location in the bypass device so that the power fluid temperature is carefully sensed and controlled while avoiding damage to temperature sensitive elements functioning with the power fluid system, the bypass device comprising:
    (a) heat exchanger means for heating power fluid located in the reservoir tank, the heat exchanger comprising (i) a cylindrical, heat conductive, external shell casing which is operatively configured for insertion into the reservoir tank to be in contact with the power fluid, (ii) inlet means for admitting a heated fluid into the casing, and (iii) outlet means for discharging the heatable fluid from the casing;
    (b) a first power fluid intake conduit, supported by the heat exchanger means, including an inlet, an outlet, and a first portion extending generally axially through the heat exchanger means and terminating with the inlet;
    (c) a second power fluid intake conduit, positioned adjacent the interior surface of the first power fluid intake conduit, including an inlet and an outlet which is operatively configured for insertion into the reservoir tank;
    (d) manifold means, defined by apertures constructed and arranged for providing fluid flow paths for the heated fluid and power fluid, for controlling fluid flow through the bypass device, the manifold means comprising a top portion, a bottom portion, and side portions, the bottom portion including connection means for connecting the manifold means with the heat exchanger means and the first power fluid intake conduit; and
    (e) bypass means, located within the manifold means, for selectively admitting flow of the heated fluid through internal chambers of the manifold means and through the heat exchanger means in response to a particular temperature of the power fluid in a power fluid manifold means outlet flow path which is adjacent to a location where the power fluid thermally influences temperature sensitive elements functioning with the power fluid system, the bypass means admitting flow of the heated fluid to the heat exchanger means when the particular temperature of the power fluid is below a predetermined minimum value, and the bypass means bypassing the heat exchanger means when the particular temperature of the power fluid exceeds a predetermined maximum value.

8. The bypass device of claim 7 wherein said bypass means comprises a self contained wax thermostat.

9. The bypass device of claim 7 wherein said first power fluid intake conduit comprises internal baffle means for turbulating the power fluid passing through the first intake conduit to provide improved heat transfer between the heated fluid in the heat exchanger means and the power fluid in the first power fluid intake conduit.

10. The bypass device of claim 7 further comprising a power fluid gauge sending unit connected to the bypass device.

11. The bypass device of claim 10 wherein the heat exchanger means is operatively configured for insertion through an opening for a power fluid gauge sending unit and into the reservoir tank.

12. The bypass device of claim 7 wherein the bypass means blocks heated fluid from entering into the manifold means and permits exiting of the heated fluid when the particular temperature of the power fluid exceeds the predetermined maximum value.

13. A method for controlling a power fluid temperature in a power fluid system having a reservoir tank by using a bypass device, comprising the steps of:
 (a) providing a bypass device comprising an external shell heat exchanger casing, a power fluid intake conduit positioned within the heat exchanger casing, and a bypass manifold, operatively coupled to the heat exchanger casing and the power fluid intake conduit, for selectively admitting flow of a heated fluid into the heat exchanger casing or bypassing flow of said heated fluid;
 (b) inserting the bypass device into a power fluid gauge sending unit opening in the reservoir tank; and
 (c) sensing a particular temperature of power fluid which is proximate an outlet of the power fluid intake conduit and controlling the selective admitting or bypassing flow of said heated fluid to maintain the temperature of the power fluid in the reservoir tank substantially near a predetermined value.

14. The method of claim 13 further comprising the step of bypassing the flow of the heated fluid from the heat exchanger casing when the particular temperature of the power fluid exceeds a predetermined maximum value.

15. The method of claim 13 further comprising the step of directing the heated fluid into the heat exchanger casing to heat the power fluid when the sensed temperature of the power fluid is below a predetermined minimum value.

* * * * *